UNITED STATES PATENT OFFICE.

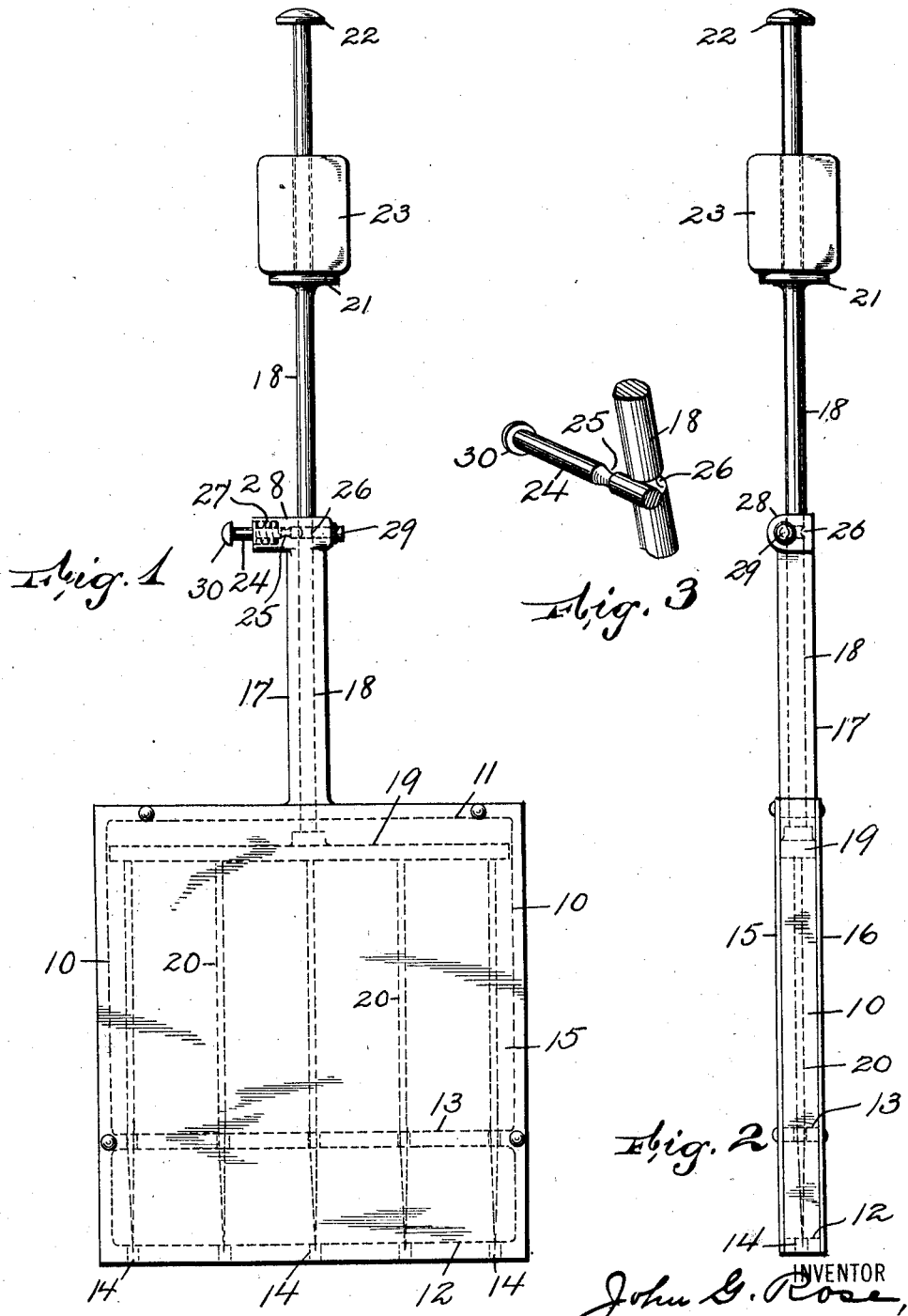

JOHN G. ROSE, OF GARWOOD, NEW JERSEY.

ICE-CUTTER.

1,360,446.  Specification of Letters Patent.  Patented Nov. 30, 1920.

Application filed April 19, 1920. Serial No. 374,876.

*To all whom it may concern:*

Be it known that I, JOHN G. ROSE, a citizen of the United States, and a resident of Garwood, county of Union, and State of New Jersey, have invented certain new and useful Improvements in Ice-Cutters, of which the following is a specification.

This invention relates to an improved ice cutter to be used in the place of the ordinary ice ax to rapidly cut out a block of ice into smaller blocks and do this without undue splintering and the scattering of small pieces.

The invention is further designed to provide an ice cutter of the type that has a series of alined needles or prongs which are normally housed in a casing but which are projected therefrom by the operation of a handle, the casing preventing injury by the prongs and also acting to strip from the prongs any pieces of material size that adhere to the prongs, the stripping taking place when the prongs retreat into the casing.

The invention is further designed to provide an ice cutter of this kind which has a latch on it to normally hold the handle, and consequently the prongs, in retracted position, so that when the device is handled and is not used at the time for cutting, there is no movement of the parts relative to one another and there is also a consequent reduction of liability to injury by engagement with the prongs, but it is possible to promptly release the latch so as not to interfere with or delay the cutting operation when it is to be accomplished.

The invention is illustrated in the accompanying drawing, in which Figure 1 is a face view of the improved ice cutter. Fig. 2 is an edge view of Fig. 1, and Fig. 3 is a detail perspective showing how the latch pin and the shaft of the handle are correlated to lock the handle against movement.

The casing is formed of a frame 10, which is preferably arranged with side bars connected at the top by a top bar 11, at the bottom by a bottom bar 12, and I prefer to place the transverse guiding bar 13 in the lower portion of the frame so that when the needles or prongs of the cover are worn down so that they are normally within the bottom bar 12, they are still held in alinement and do not become bent or twisted in the openings 14 in the bottom bar 12, through which the needles or prongs, to be described hereinafter, pass.

The plates 15 and 16 are placed on the front and back, respectively, and inclose the frame. The casing has a top tubular stem 17, into which is arranged to slide a bar 18, the bar having at the bottom a cross-head 19, into which the prongs or needles 20 are inserted, usually by being provided with screw-threads which permit them to be screwed into screw-threaded holes in the cross-head 19. These needles or prongs 20 are pointed at their lower ends and are adapted to be projected out through the holes 14 and are substantially in line.

The bar 18 is provided near the top with a collar 21 and at the top with a stop 22, and loosely fitting on the rod between the collar and the stop is a handle 23. This handle is arranged to slide freely on the rod and when moving up and down is limited in its movement by its engagement with the collar 21 or the stop 22, the handle 23 being usually of metal and thus providing a substantial weight. It adds to the blow and increases the impact of the prongs on the ice without making the movement excessive or laborious.

On the tubular stem 17 I place a latch, and the preferred place is at the top of the stem, this latch being adapted to normally hold the bar 18 in raised position, that is, in the position it occupies when the prongs or needles are drawn into the casing, so that the bottom of the casing prevents contact with the points of the needles. The form of latch shown consists of a latch stem 24, which is cut away, as at 25, to receive the rod 18, the rod 18 being cut away, as at 26, to receive the latch stem 24. The latch stem is normally pushed outward by a spring 27 within the casing 28 at the top of the tubular stem 17, and the movement of the stem 24 is limited in a forward direction by a suitable stop, such as a nut 29, and is provided on its forward projecting end with a finger piece 30.

When the bar 18 is grasped to raise the cutter, either for the purpose of getting it ready for use or for carrying it, the weight of the casing and the tubular stem carries these down so that the casing covers the points of the needles. When the device is to be used it is placed so that the casing, which is a substantially flat narrow casing, is placed over the location where the cut is to be made, and the left hand grasps the tubular stem and the finger presses on the finger piece 30 to press the latch and stem 24 against the pressure of the spring 27, so that the cut-away part of the groove 25 is in line with the rod 18. This releases the rod 18 and the handle 23 is then manipulated vertically, and a few blows, first up and then down, cause the needles or prongs 20 to be rapidly reciprocated with considerable force downward, and these alined small openings cause the severing of the ice along the line of these openings, this fracture of the ice being characteristic of the material, and I have found that a number of prongs placed on a medium sized cutter are sufficient for quickly cutting a large cake of ice. The covering of the place of cutting at the bottom of the casing has the effect of holding the ice against fracture to any excessive extent, and there are very few small chips or pieces when the cutting is completed.

It will be understood that modifications can be made in the construction of the parts and also in their relative arrangements without departing from the scope of the invention.

I claim:

1. An ice cutter comprising a flat casing, a rod projecting into the casing and providing a handle portion on its outer end, alined prongs on the end of the rod within the casing and adapted to be projected therefrom by manipulation of the rod so as to cause a series of alined penetrations of the ice, and a latch for holding the rod in its retracted position.

2. An ice cutter comprising a substantially flat casing, a rod projecting into the casing, a cross-head on the rod, alined prongs projecting from the rod, the casing having guiding means to direct the prongs and to cover the points of the prongs when the rod is retracted, and a latch for holding the rod in retracted position.

3. An ice cutter comprising a substantially flat casing, a rod projecting into the casing, a narrow cross-head on the rod, alined prongs projecting from the rod, the casing having guiding means to direct the prongs and to cover the points of the prongs when the rod is retracted, a spring latch for holding the rod in retracted position, a stop on the top of the rod, a collar between the top of the rod and the latch, and a handle of considerable weight sliding freely on the rod and adapted to have its movement limited by engagement with the stop and the collar.

4. An ice cutter comprising a substantially flat casing with substantially alined openings in the bottom, a cross-head slidable in the casing and having prongs alined with the openings and adapted to be projected therefrom, a rod projecting from the cross-head through the top of the casing, a tubular stem on the top of the casing through which the rod slides, and a latch in the tubular stem for holding the rod against movement when it is in its retracted position.

5. An ice cutter comprising a casing including a frame having top and bottom bars and an intermediate guiding bar, the bottom bar and the guiding bar being perforated, a cross-head in the casing, a set of prongs on the cross-head in alinement with the openings in the guiding bar and the bottom bar, a tubular stem on the casing, a rod projecting from the cross-head and through the stem, and means on the top of the rod for reciprocating it.

6. An ice cutter comprising a casing including a frame having narrow top and bottom bars and an intermediate narrow guiding bar, the bottom bar and the guiding bar being perforated, a cross-head in the casing, a set of alined prongs on the cross-head in alinement with the openings in the guiding bar and the bottom bar, a tubular stem on the casing, a rod projecting from the cross-head and through the stem, means on the top of the rod for reciprocating it, the rod having a collar thereon, and a stop thereon, the collar and the stop being spaced apart, and a handle sliding freely on the rod between the stop and the collar, the handle being of material weight.

In testimony that I claim the foregoing, I have hereto set my hand, this 15th day of April, 1920.

JOHN G. ROSE.